United States Patent [19]

Morgan-Voyce

[11] 3,721,965

[45] March 20, 1973

[54] APPARATUS FOR FORMING A MULTIPLE IMAGE LASER OPTICAL MEMORY

[75] Inventor: Albert M. Morgan-Voyce, Oklahoma City, Okla.

[73] Assignee: Honeywell Information Systems Inc., Phoenix, Ariz.

[22] Filed: Nov. 22, 1971

[21] Appl. No.: 201,600

[52] U.S. Cl.............340/174 YC, 350/169, 350/96 T, 350/151

[51] Int. Cl. ...............................................G11c 11/14

[58] Field of Search...340/174 YC, 173 LT, 173 LM; 350/160, 169, 96 T, 151; 356/114

[56] References Cited

UNITED STATES PATENTS

| | | | |
|---|---|---|---|
| 3,164,816 | 1/1965 | Chang et al. | 340/174 YC |
| 3,368,209 | 2/1968 | McGlauchlin et al. | 340/174 YC |
| 3,582,183 | 6/1971 | Schmidt | 350/160 |

*Primary Examiner*—Stanley M. Urynowicz, Jr.
*Attorney*—James A. Pershon et al.

[57] ABSTRACT

A modulated laser beam having a uniplanar, two direction deflection is directed to a mirror tunnel. The mirror tunnel divides the single laser beam into multiple laser beams. The multiple laser beams are polarized and a beam selector permits only one raster scan from the multiple images of the mirror tunnel to reach the memory film target. The Curie-point recording method forms the information onto the film. For reading information from the target, the laser beam is deflected, multiplied and selected as for writing. Reflected light from a spot on the target exhibits a clockwise or counter-clockwise change in the polarization angle depending on the binary state of the magnetic field. The Kerr-effect polarization change is passed through a polarization filter which permits one state of the magnetic field to be passed and blocks the second state of the magnetic field. The light passing through the polarizing filter is collected by a lens and detected by a light detector such as a photocell. The output of the light detector is directed to a utilization device for use therein.

6 Claims, 7 Drawing Figures

INVENTOR.
ALBERT M. MORGAN-VOYCE

BY James A. Pershon
ATTORNEY

APPARATUS FOR FORMING A MULTIPLE IMAGE LASER OPTICAL MEMORY

BACKGROUND OF THE INVENTION

The present invention relates generally to storage devices and more particularly to storage devices using a modulated and deflected laser beam directed via a mirror tunnel to a multiple imaged target for storing binary information.

1. Field of the Invention

The present invention is particularly utilized in high speed data processing systems requiring a large amount of information to be stored on and retrieved from a storage device. In order for a storage system to be useful in a high speed data processing system, the information to be retained must be accurately and quickly placed on and retrieved from the storage device. The vast amount of data information necessary for storage in a storage device places a severe limitation on the size of the storage device. The laser beam, with its minute concentration of light, presents a unique source for placing information onto a small area of a storage device and permits the retrieval of that information.

2. Description of the Prior Art

Prior art systems for storing information included magnetic tapes, drums, discs, and magnetic cores. In order to store all of the information required by a high speed data processing system, a large number of the prior art storage systems were used in combination in an attempt to keep up with the information storage required. The sheer size of each of the devices requires that higher speeds and increased packing density be specified in order to keep the total storage size to a reasonable dimension.

Because of this and because of the known concentration of light power in a laser beam, optical storage devices have been sought to solve the information storage problem. In order to permit quicker access time to an optical storage device, a multiple imaged target had to be presented to the laser beam. The addressing of the multiple imaged target then became a problem in that the laser beam can only be deflected through a rather small uniplanar height and width direction. In order to scan each image of a multi-imaged target, the laser system itself had to be displaced in the height and width directions to position the laser beam to one image. This then required a second addressing in the X and Y direction and also required time to displace the laser beam generating device.

SUMMARY OF THE INVENTION

In accordance with the invention as claimed, a target storing information in a plurality of image areas on the target is scanned by a modulated laser beam. The laser beam is deflected in two uniplanar directions to scan only one image of the target. The deflected laser beam is directed into the multiple imaging device such as a mirror tunnel to provide multiple laser beams, one for each of the multiple images on the target. The multiple imaged laser beams are passed through a beam selector which is actuated to select one laser beam for one image from the multiple images on the target area. The laser beam selected by the beam selector provides the light beam power for encoding the information on the target and reading therefrom.

In accordance with the preferred embodiment as disclosed, the target is a magnetic film and binary information is formed on the film by the Curie-point recording method. To write the information on the film, the laser beam is modulated according to the binary information. The modulated laser beam is directed into a two-directional deflector to perform a scan of one image portion of the multiple imaged target. The deflected laser beam is directed into a mirror tunnel to provide multiple modulated and deflected laser beams. A particular beam is selected by a beam selector to scan one image portion of the target. This selected beam is passed through a polarizing filter to record the information modulated into the laser beam onto the magnetic film forming the target via the Curie-point recording method.

To read, the laser beam is set to a reduced power mode below the power required to reach the Curie-point recording temperature on the target film. The laser beam is deflected, multiplied and selected as before for the write operation. The polarization change from the beam reflected from the target surface via the Kerr-effect is passed through another polarizing filter which determines the relative position of the reflected light. The reflected light is gathered and detected, thereby determining the state of the bit of information scanned from the one image on the target area. The laser beam is deflected in two uniplanar directions to scan the entire selected image from the multiple image target storage area.

It is, therefore, an object of the present invention to provide an enhanced memory store for a data processing system.

It is another object of the present invention to provide an improved method of storing binary information.

It is another object of the present invention to provide a multiple imaged memory store using a laser beam scan.

It is yet another object to provide a new and improved memory store which uses a multiple imaged laser beam with Curie-point recording and Kerr-effect or Faraday-effect reading.

Another object of the invention is to use a mirror tunnel to multiply the number of images that can be scanned by a light beam from a target coded with a magnetic film.

Yet another object of the present invention is to provide a method of recording and scanning a multiple imaged magnetic film by the use of a deflected and modulated laser beam along with a mirror tunnel to multiply the light beams of a laser and a beam selector means to allow scanning of any individual image area from the magnetic film target storage.

Yet another object is to provide a laser beam actuated storage system that permits a substantial increase in the storage capacity on the magnetic film without the need to move or rotate either the target storage film or the laser beam generator.

BRIEF DESCRIPTION OF THE DRAWING

A complete understanding of the present invention and of the above and other advantages thereof may be gained from a consideration of the following detailed description of an illustrative showing thereof presented hereinbelow in connection with the accompanying drawing in which.

DESCRIPTION OF THE PREFERRED EMBODIMENT

Figure 1:
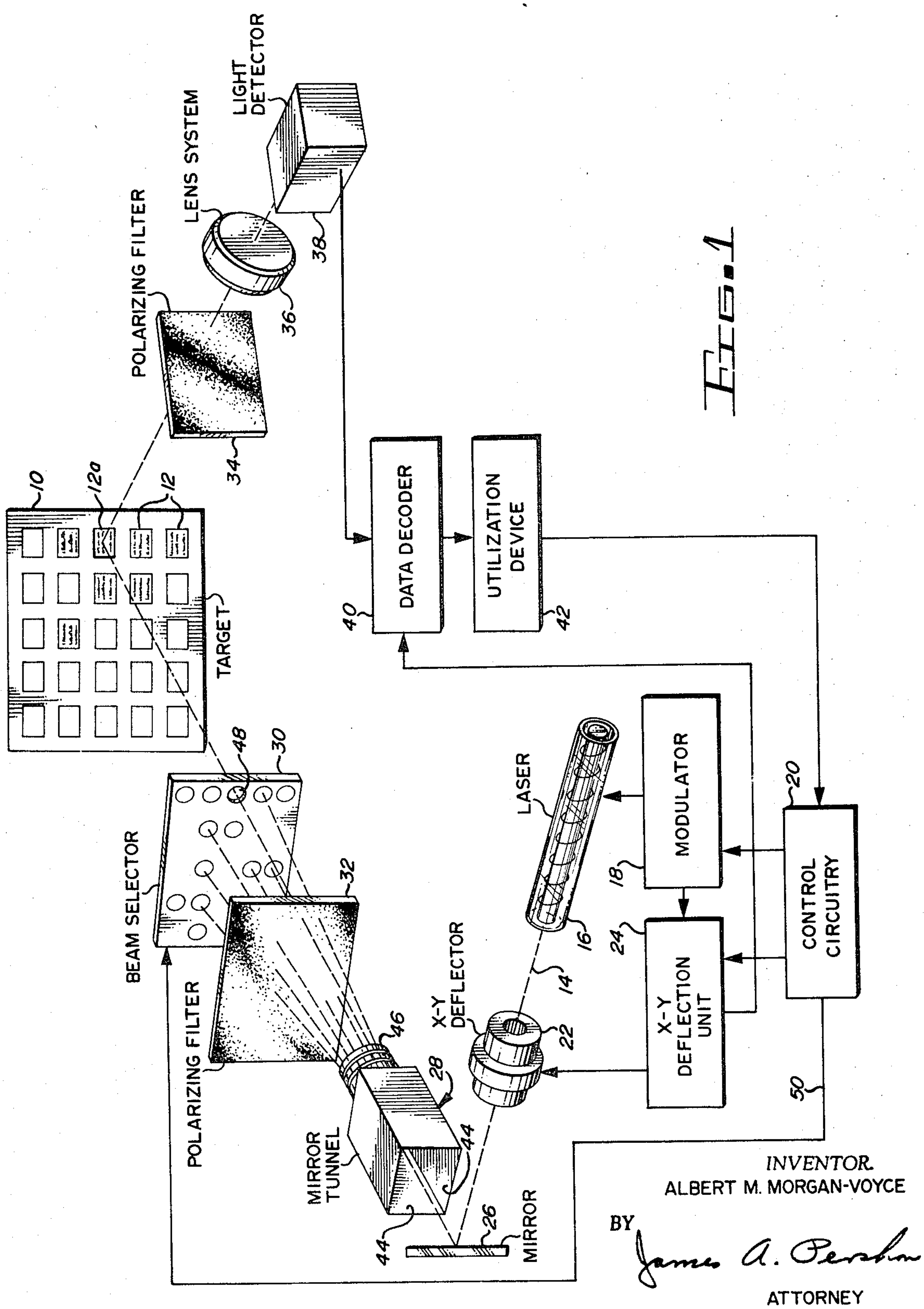
FIG. 1 is a combined block diagram and apparatus representative of a memory system in accordance with the present invention.

In FIG. 1 is shown a diagrammatic outline of an optical memory according to the present invention. A target 10 comprising a magnetic film or other light sensitive media stores the information for the use of a data processing system for instance. The information is stored on the target 10 in a plurality of areas designated images 12. The images 12 are formed in a width and height, X and Y, direction on the target 10. The information in the image portion of the target 10 is formed by a light beam 14 generated through light amplification by simulated emission of radiation commonly called a laser 16.

The laser light beam 14 is modulated by a modulator 18 to produce a series of light pulses corresponding to an information bit pattern generated by a block entitled control circuitry 20. In synchronism with the modulator pulses, an X-Y deflector 22 deflects the light beam 14 from the laser 16 in the uniplanar X and Y (horizontal and vertical) direction to produce a raster type scan. The X-Y deflector 22 is controlled by an X-Y deflection control circuit 24. The modulation and deflection of the laser beam will be explained in more detail later.

The emerging laser beam from the X-Y deflector 22 is shown reflected by a mirror 26 into a mirror or optical tunnel 28. The mirror 26 is shown in FIG. 1 for ease of layout of the optical memory system and it should be evident that the laser beam could be directed into the mirror tunnel 28 directly from the X-Y deflector 22. The X-Y deflector 22 provides a very small angular displacement of the laser beam sufficient only to provide a scan over one image 12 of the target 10.

Since the laser light beam 14 can be deflected only a very small angle, the multiplication of the laser beam 14 by an image multiplication means, such as a mirror tunnel 28, provides a means for the small initial deflection of the laser beam to cover a multiple-imaged large target area. The laser beam 14 has sufficient initial power to permit a multiplication of the laser beam without deterioration beyond the use. A beam selector 30, such as a rotatable disc with holes in selected angular positions or a collection of Kerr-type optical cells, is used so that only one of the multiple laser beams strikes the target area. Without the beam selector, the multiple laser beams will strike all of the multiple images 12 on the target 10 at the same relative position on each image.

Polarizing filters are used so that the Faraday effect or the Kerr effect may be used to detect the presence of a "1" or a "0" by the change in rotation of the polarization angle of the light passing through, or reflected by, the magnetic film on the target. The laser beam is passed through a polarizing filter 32 before striking the target 10. During read, any change in rotation of the polarization angle after the laser beam strikes the image 12 on the target 10 is detected by a second polarizing filter 34. The light passing at the correct angle through the polarizing filter 34 can be detected as one position of the binary information bit and no light or light striking the polarizing filter 34 at an incorrect angle can be used as the second binary position of the information bit. The light passing through the second polarizing filter 34 is gathered by a gathering means such as a lens system 36 and is focused onto a light detector 38 such as a photocell which acts as a receiver or a detector of the light reflected from the image. The signal detected by the light detector 38 is amplified and decoded by a data decoder shown as block 40, and directed to the utilization device 42 which senses the presence or absence of a light and thereby senses the binary information bit from the storage device.

The reading or sensing section comprises the second polarizing filter 34, the gathering means 36, the light detector 38, and the sensing circuits 40 and 42. The light from the laser beam 14 must be prevented from entering the sensing section during the time information is recorded on the target 10 because of the increased power used to write information into the image area 12. It is, of course, possible to decrease any reflected light by using a darkened lens to enable the laser beam to be sensed while writing the information bits on the image area. A light shutter could also be used to prevent any reflected light from reading the sensing area.

To record the binary information bit signals on the image area of the target, that is, to write the information bits into the storage area, the laser beam is modulated by a modulator to control the transmission of the laser beam in an on and off state determined by the binary state of the information bit. The increased power of the laser beam during a write operation will cause an element of the image area of the target storage struck by the laser beam to be raised above the Curie-point temperature. The laser beam striking an element could be representative of one binary state of the information bit. Turning off the beam will then be indicative of the second binary state of the information bit. The laser beam is initially deflected by the X-Y deflector which deflects the laser beam to scan one image from the multiple-imaged target storage area. The deflected laser beam is then directed into the mirror tunnel where the deflected laser beam is divided into a plurality or multiple of laser beams to scan all of the images of the target area at one time. A beam selector permits only one raster scan to reach the target storage. Any raster scan may be selected one at a time. A polarization filter insures that light of a single polarization only strikes the target. The polarized light striking an element of one image area of the target storage for a period of time will raise that element to or above the Curie-point temperature so that any present magnetism is lost. Closure flux from the surrounding "0" magnetic state will cause flux lines to pass into the surface of the material while it remains at or above the Curie-point temperature. When the laser beam is switched off by the modulator, the surface of the spot will rapidly cool below the Curie-point temperature and will therefore be magnetized in the reverse state which can represent a "1" binary state. The two reverse magnetic states may be interchanged, if desired, to represent either a "1" or a "0".

Still referring to FIG. 1, the laser 16 which stands for light amplification by simulated emission of radiation, amplifies light waves, as waves, without converting them first to electronic vibrations. The laser 16 is capable of emitting a light beam 14 of a very high energy level. There are many types of lasers which can be used to emit the beam of light usable in the memory system shown in FIG. 1. Reference is made to chapter 5 of the book Laser Systems and Application by Herbert A. Elion, published by the Pergamon Press of New York and copyrighted in 1967. Many different types of lasers are usable in the optical memory circuit according to the present invention and since the type of laser to be used is not part of the invention disclosed herein no further discussion of the type of laser is believed to be necessary. The laser must merely be of a type capable of generating a high energy light beam. The energy must be sufficient to enable the light beam to be divided and increased in number to a multiple of light beams and yet each beam must contain sufficient energy to raise the temperature of the magnetic film comprising the target to or beyond a specific temperature which is called the Curie-point temperature. This operation will be further described later.

The laser beam 14 may be modulated in a similar manner to that for any other electromagnetic wave. The modulation of a laser beam is merely a means of switching the laser on and off to provide a light beam of a very short duration. The short time is necessary to record a single bit of information at a relatively high frequency of operation. The laser modulator 18 is actuated by the control circuitry 20 in an on and off manner to form the binary bits of information that are to be formed in the image on the target.

There are many ways of modulating a laser beam, the usual ways chosen are frequency, amplitude or phase. The modulation may also be either internal or external. Internal modulation refers to modulating the signal beam generated by the laser beam itself. External modulation refers to passing the emitted beam through a modulating process. A usual form of internal modulation concerns a small change in cavity length of the laser. The frequency of the laser beam is related to the cavity length of the laser. A change in the cavity length thus modulates the output frequency of the laser beam. Other methods of internal modulation include magnetic modulation where energy levels may be varied magnetically and the Zeeman effect which may be used to tune in the divalent rare earths used in the generation of the laser itself.

Two of the classes of external electro-optical modulators are one which possess the quadratic Kerr-effect and a second which comprise a linear effect such as certain cubic crystals. The Kerr-cell contains a liquid which is able to polarize light when a voltage is applied across the cell. If a Kerr-cell is placed between polarized light coming from a light source polarized in one direction and an analyzer polarized in the same direction, then the Kerr-cell may be used as a laser modulator. The analyzer is simply a grating which will permit only light from one polarization direction to pass through it. Similarly a crystal material may be used to vary a polarization of light and thereby modulate the amount of light passing through an optical system. There are many types of laser modulation devices, reference is made to chapter 6 of the aforementioned book Laser Systems and Application for different types of modulators which can be used in the memory system according to the present invention.

There are basically two generic methods of deflecting a laser beam in the X plane or Y plane or both. In either case, the amount of deflection that can be obtained is rather small. Thus in the target shown in FIG. 1 the amount of deflection is in the height and width of one image comprising the entire target. To deflect the laser beam over the entire target area would require a mechanical device which causes the laser beam to sweep over the entire height and width of the target. This type of deflector would of necessity be a very slow device. This of itself would defeat the very advantage of using a laser beam in an optical memory system.

A type of deflector which is usable in the X-Y deflector 22 of FIG. 1 can consist of a galvanometer type of deflector. The galvanometer deflector includes a mirror which can be deflected at a very high frequency. By vibrating the mirror over a very small X deflection and by cascading a second mirror vibrating at right angles to the first mirror, an X-Y deflection of the laser beam can be accomplished. This of course is not a precise method of performing the deflection of the laser beam because it involves mechanical movement.

One electron beam deflector makes use of electrically induced crystals. The refractive properties of the crystals can be varied by an application of a voltage which causes an electric field to appear in the material. Hence a radiant beam such as a laser beam going through the crystal can be deflected by applying a voltage to the crystal. In consequence, the beam can be deflected through very small angles by an electric field. Many other types of deflection systems are usable in the X-Y deflector of FIG. 1. Reference is made to chapter 11 of the aforementioned book Laser Systems and Application, especially pages 145 through 154.

Thus the laser beam 14 has been generated by the laser 16, modulated by the modulator 18, and deflected in a uniplanar X and Y direction by the X-Y deflector 22 all under control of the control circuitry 20. The modulated and deflected single laser beam 14 is then directed into the mirror or optical tunnel 28. To achieve the multiple images on the target area, many separate lens systems could be used to obtain the multiple images from the singular laser beam. However a single lens system with a square cross section forming a mirror tunnel can be used to accomplish the multiple image and thereby avoid the problems of mounting the multiple lens.

Figure 6:
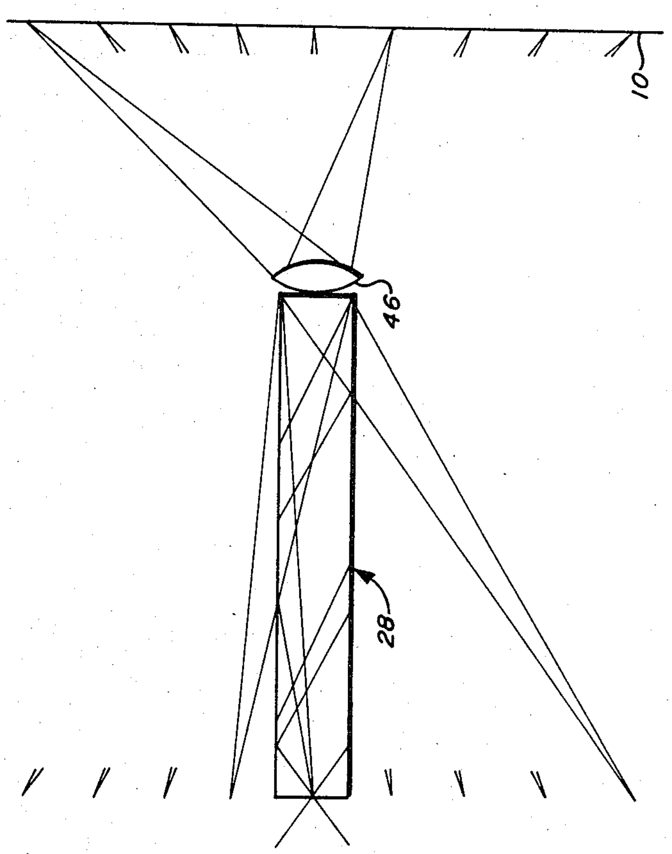
FIG. 6 shows the operation of a mirror tunnel.

The mirror or optical tunnel 28 consists of four front-surfaced mirrors 44 carefully aligned to form a tunnel of exactly square cross section. In combination with a lens 46 the mirror tunnel is capable of projecting many images of one object on a screen. Referring now to FIGS. 1 and 6 for a description of the operation of the mirror tunnel 28, an object such as the laser light beam 14 placed at the entrance face of the mirror tunnel 28 will be duplicated by successive reflections from the mirror walls 44 ad infinitum. The lens 46 placed at the end of the tunnel will reimage the plane of images at any desired point in space such as the target 10, depending on the focal length of the chosen lens 46. The total number of comparison channels provided by the optical tunnel and lens combination is determined by the focal length of the lens 46, the cross section dimensions of the tunnel, and the angular field which the lens 46 can cover with sufficient quantity to meet the demands of the optical processing to be performed on each individual channel. The mirror tunnel system thus comprises an optical means for multiplying the number of light beams. In the embodiment being described the mirror tunnel includes a tunnel made of mirrors and a lens.

Referring now to FIG. 1, if a point source of light such as the laser beam 14 is placed on the axis of the mirror tunnel 28, the point source will be imaged by the lens 46 and mirrors 44 combination. The image produced on a target will comprise many point sources of light all equal distances from each other in a square similar to that shown in FIG. 1 reflected on the beam selector 30. The vertical and horizontal rows of images of the point source of light passing through the center image are formed only by opposite parallel faces of the mirrors 44 forming the mirror tunnel, while all of the other images are the result of some corner reflections. For a more complete description of a mirror or optical tunnel, reference is made to an article entitled, "The Optical Tunnel—A Versatile Electro-optical Tool" by L. J. Krolak and D. J. Parker appearing in the March, 1963, Vol. 72, Journal of the Society of Motion Picture and Television Engineers, pages 177–180.

Still referring to FIG. 1, all of the multiple images from the mirror tunnel 28 but for the beam selector 30, would impinge on the target 10 in the image areas 12 as shown on the target. The beam selector 30 therefore comprises a means of selecting one of the multiple reflections from the mirror tunnel and letting this one pass unobstructed to strike the target, as shown in a one opened shutter 48 allowing the passage of one laser light beam.

The beam selector 30 could be a collection of Kerr-type optical cells or an electromechanically operated shutter system. Many types of beam selectors can be envisoned for use in the present invention. The shutter type could be solenoid operated and controlled by the control circuitry 20 via the control line 50 such that the correct X and Y function of the beam selector 30 might select the correct shutter such as opened shutter 48 to operate and pass the selected laser beam to impinge on the target. A series of light switching cells, such as a Kerr-cell, may be used for the beam selector 30. By applying an electrical signal to a Kerr-cell, an electric field causes changes in the properties of the material comprising the cell. The cell can be a crystal or a liquid construction and therefore by the application of the voltage, the electric field causes changes in the crystaline structure or the specific reflective properties of the material. Therefore any one of the series of light switching cells may be selected and by means of applying a specific voltage signal, the particular cell will permit light to pass through and strike the target.

Another beam selector could comprise a disc with holes at selected radial and angular positions to permit the laser beam raster scan to pass on and strike the target. By rotation of the discs, any particular scanning angle may be selected. The disc could be rotatable by means of a disc drive on external command such that any raster scan may be rapidly selected. The only requirement is that only one raster scan can be visible at any one time.

The target 10 for the preferred embodiment comprises a magnetic film such as manganese bismuth (Mn-Bi) coded or plated on a flat smooth surface. The target size and distance from the mirror tunnel 28 will permit N raster scan image positions to be available, each image 12 covering a small area in the X and Y direction on the target 10. Associated with each image or raster scan position is a simple electromagnetic circuit (not shown) which is switched on and off as required to preset the magnetic field of the surface material such that the magnetic field will point outward from the surface corresponding to a "0" state. This circuit would preset the target image to a zero position to clear the memory address and thereby permit the laser beam to selectively strike the target image to record a "1" state.

In order to record in one image area of the target, the laser beams from the mirror tunnel pass through the polarizing filter 32 to obtain polarization of the beams, all in a particular direction. Only one of these beams are selected by the beam selector 30 and strike the target 10. The polarized light striking an element of the target for a selected length of time will raise an element of the image to, or above, the Curie-point temperature so that the preset magnetism is lost. Closure flux from the surrounding "0" magnetic state will cause flux lines to pass into the surface of the material while it remains at or above the Curie-point temperature. All ferromagnetic substances have a definite temperature of transition at which the phenomenon of ferromagnetism disappears and the substances become merely paramagnetic. This temperature is called the Curie-point temperature and is usually lower than the melting point of the substance.

When the laser is switched off by the modulator, the surface of the spot will rapidly cool below the Curie-point temperature and will therefore be magnetized in the reverse state of the preset state. This reverse state could represent a "1." It is evident that the two magnetic states may be interchanged, if desired, to represent either a "1," or a "0." The phenomenon of changing the magnetic state of an element in an image of the target by raising the temperature of a localized point is known as Curie-point recording.

Curie-point recording is based on a phenomenon of certain magnetic materials wherein the magnetic characteristics are only present below a certain critical temperature known as the Curie-point temperature. If the temperature of magnetic materials is continually raised up to the point where the microstructure of the material becomes increasingly disordered, there comes a point where all of the magnetic dipoles within the material, the magnetic domain depending on the type of material, become so disordered that at a specific temperature, called the Curie-point temperature, the magnetic characteristics of the material disappear. The magnetic characteristics of particular magnetic material may be plotted either in magnetic strength, remanence, and so on over a temperature range. By increasing the temperature, at a critical temperature the magnetic characteristics of the particular magnetic material entirely disappear. This critical temperature is the so-called Curie-point temperature.

One of the many techniques which has been developed based on the Curie-point phenomenon is in the use of a memory system where a magnetic surface is polarized in a particular direction, for example, all of the magnetic poles pointing outward. If a small spot on the material is heated to the Curie-point temperature, that particular point on the entire surface will not have any magnetic material. As the temperature is lowered, the other poles from the surrounding area will cause its magnetic flux to start infringing on the area which was heated to the Curie-point temperature. As the point is cooled below the Curie-point temperature, it would therefore end up with magnetic poles in its area pointing in the opposite direction. For a more thorough description of the Curie-point temperature recording, references is made to pages 4–118 and 4–132 to 135 of the Handbook of Physics, edited by E.U. Condon and H. Odishaw published by McGraw-Hill Book Company, Inc., New York, in 1958.

Still referring to FIG. 1, in order to read the spot recorded according to the Curie-point recording, the laser is switched to a reduced power mode to prevent changing the information recorded in the image of the target. The reflected light from the spot on the target recorded according to the Curie-point recording method will exhibit a clockwise, or counterclockwise change in the polarization angle depending upon whether it is reflected by a "1" or a "0" state magnetic field. Polarization change from a reflected surface that has an associated magnetic field is known as the Kerr-effect. The reflected light then passes through the polarizing filter 34. When the angle of the polarizing filter corresponds to a "1" state it will pass light on to the lens. In a "0" state there will be a substantial reduction in the light passing through the polarizing filter because of the angular rotation change of polarization of the reflected beam.

Figures 4, 5:
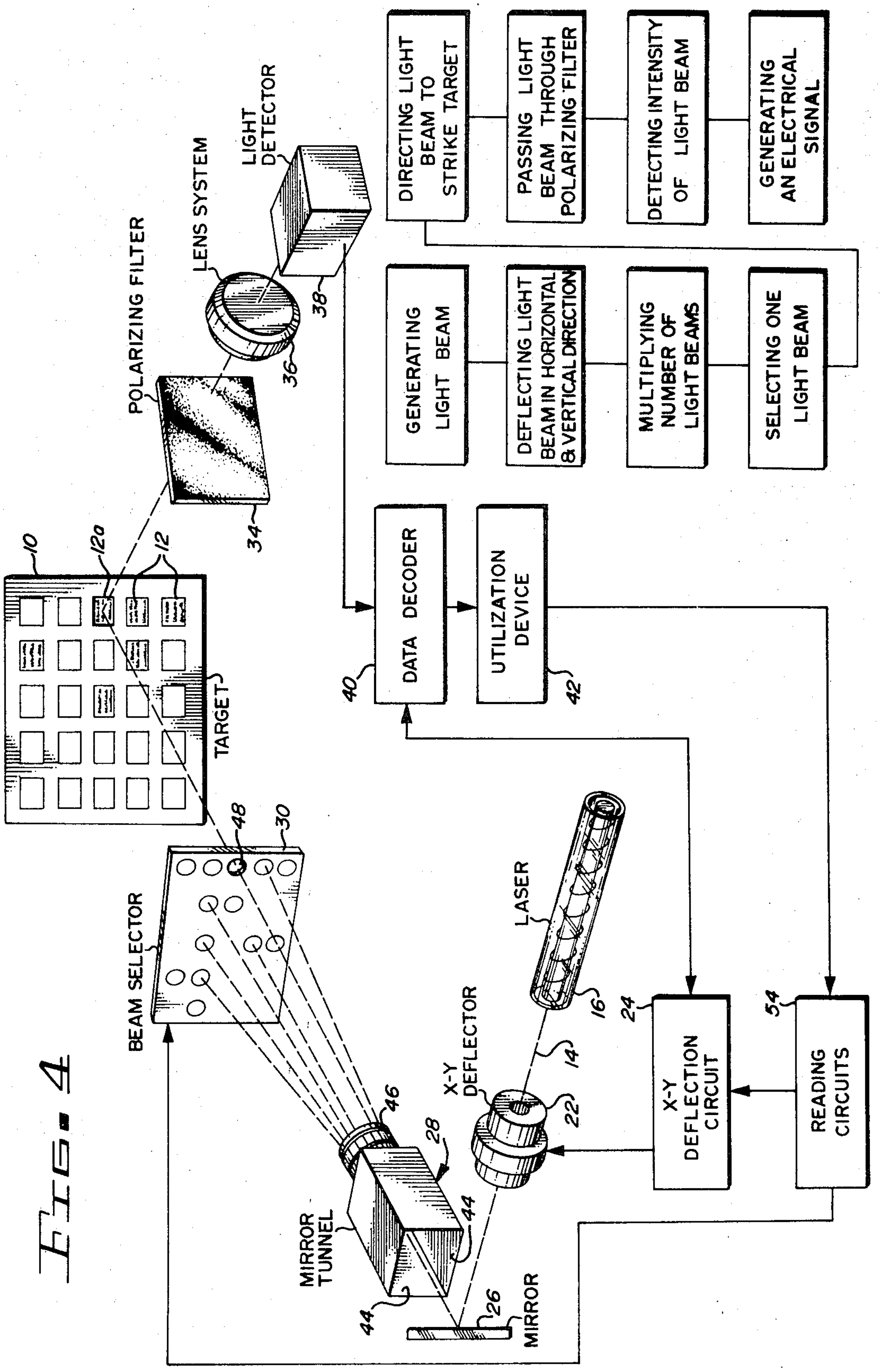
FIG. 4 shows a partial diagram of the memory system of FIG. 1 showing the blocks and apparatus necessary for a read operation.
FIG. 5 shows a flow diagram of the method steps necessary for performing the read operation according to FIG. 4.

A gathering means, such as a lens 36 of the correct focal length, resolution, and aperture, collects the reflex light beam, the reflected light beam, from any part of the target and focuses the light on the light detector 38. The light detector 38 may be a photocell or a photo multiplier cell. The light detector 38 generates electrical signals according to the light striking the light detector. These electrical signals are directed to the data decoder 40. The data decoder 40 is controlled in a manner similar to the X-Y deflection circuit of the laser X-Y deflector 22 in order to sense the correct positioning of the information such that, as the laser beam is deflected over the image area of the target as a sweeping or scanning beam, the data decoder 40 is kept in step. This information is then directed to a utilization device under control of the reading circuit for use therein. A more complete description of the apparatus required for the reading of the information from the target is shown in FIG. 4 and will be described in more detail in a read operation laster.

Figure 3:
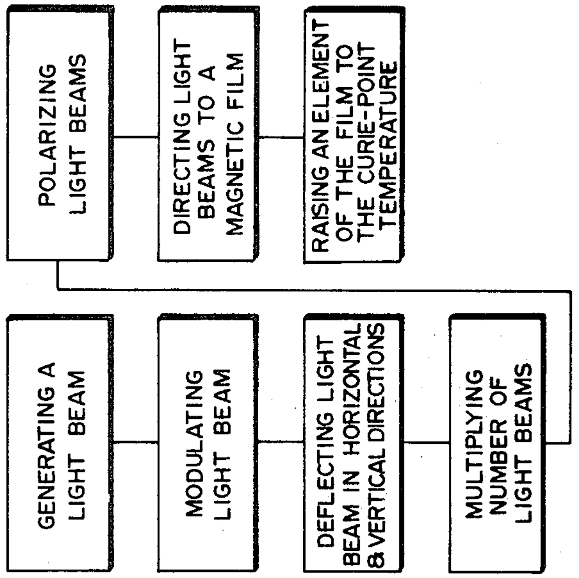
FIG. 3 shows a flow diagram of the method steps necessary for performing the write operation according to FIG. 2.
Figure 2:
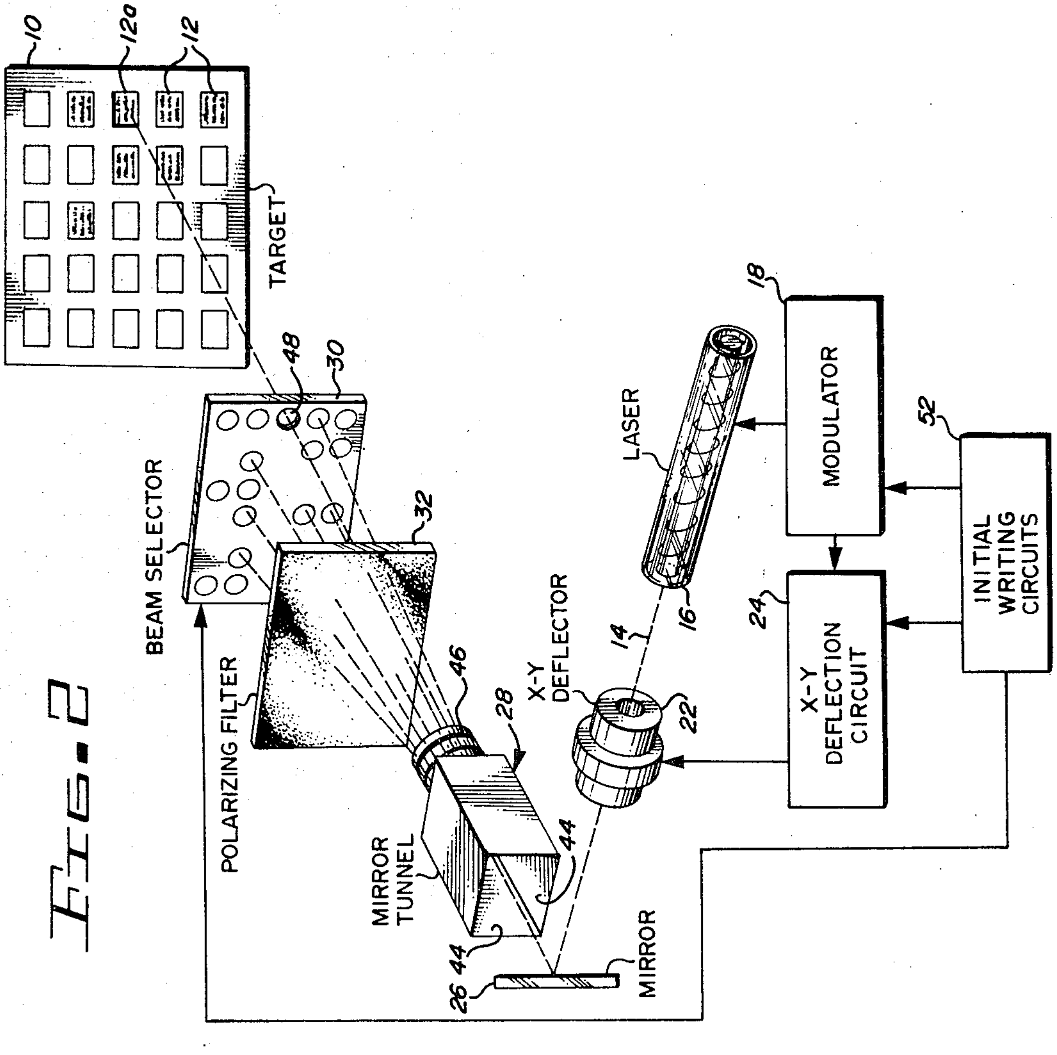
FIG. 2 shows a partial diagram of the memory system of FIG. 1 showing the blocks and apparatus necessary for a write operation.

The apparatus necessary for recording the information onto the target according to the system of FIG. 1 is shown in FIG. 2. The method steps for performing a write operation are shown in FIG. 3. Referring now to FIGS. 2 and 3, the record or write operation is controlled by input writing circuits 52 located generally within the control circuit 20 (see FIG. 1). The input writing circuits 52 control the frequency at which the laser beam is switched on and off by the modulator 18 and the corresponding X and Y deflection circuits 24. The modulator 18 determines the frequency at which the writing will occur. The X-Y deflection circuit 24 controls the X-Y deflector 22. The X-Y deflection circuit and deflector determines the frequency of scan along with the modulator by scanning the laser beam in a horizontal direction, the X direction. The vertical or Y direction is controlled by the Y deflector and deflection circuits to cause a second line to be scanned by the laser beam a certain distance below the first line of scan. By this method the area of the image on the target is scanned in a horizontal direction generally from left to right and from top to bottom with each horizontal scan displaced vertically beneath the preceding scan. The information comprising the binary "1" and "0" signals controls the input writing circuits which in turn control the modulator. Thus the modulator for instance turns the laser beam on for a "1" bit of information and turns the laser beam off for a "0" bit of information. The frequency by which the modulator turns the laser beam on and off along with the X deflector determines the spacing of each bit of information and the image area.

Thus the laser beam 14 is generated by the laser 16 under the control of the modulator 18. This modulated laser beam is directed to the X and Y deflectors 22 to cause the modulated laser beam to scan an image. The modulated and deflected laser beam is then directed into the mirror tunnel 28. As stated previously, the mirror tunnel multiplies the point source of light produced by the laser beam. The plurality of sources of laser light beams at the output of the mirror tunnel 28 are directed into a polarizing filter 32. The multiple laser beams strike the beam selector 30. The beam selector 30 has been actuated by the utilization device via the input writing circuit 52 to select the one image area on the target that is to record the information being transmitted. As shown in FIG. 2, one laser beam is permitted to pass through an actuated shutter 48 of the beam selector 30 and impinge on the target 10.

The laser beam as emitted by the laser must have sufficient power on the write operation to be capable of being divided into a plurality of beams by the mirror tunnel and still have sufficient power in each beam to strike an element of the target for a period of time sufficient to raise the temperature of that element to or above the Curie-point temperature. Raising that element to or above the Curie-point temperature loses the preset magnetism of that one small area. For the instance being described we will assume that an element that loses its magnetism will define a "1" bit of information. Thus the input writing circuit defines a "1" when the modulator allows the laser to transmit a laser beam. The input writing circuit at that particular time has defined an X and a Y location on the image area and has caused the X-Y deflector 22 to have positioned the laser beam in that one particular element area. The multiplication of the laser beam by the mirror tunnel 28 without the beam selector would cause that one bit of information to be written in the identical location of all of the images on the target. Therefore the beam selector 30 selects the one particular image area that is to contain the particular information. The laser is then switched off by the modulator to allow the surface of the target at that element to cool below the Curie-point temperature and therefore causing that element to be magnetized in the reverse state of the preset state by flux fringing from the surrounding elements. It is therefore evident that a series of bits of information either in a 1 or 0 state can be written onto the image area of the target.

In order to read this information recorded in the image area of the target, reference is made to FIG. 4 of the drawing. The method steps for performing a read operation are shown in FIG. 5. For reading one element to determine the magnetic state of the element, the laser is first switched to a reduced power mode. The reduction in power is necessary in order to prevent an erasure of the information previously recorded. This of course is assuming that a nondestructive read mode is desired. A reading circuit 54 of the control circuitry 20 (see FIG. 1) controls the X-Y deflection circuitry 24. The laser 16 is permitted to operate in continuous actuation without modulation. The reading circuit 54 actuates the beam selector 30 via the control line 50 to allow one image area 12a to be scanned by the laser beam 14. The reading circuit 54 is controlled by the utilization device 42. The reading circuit 54 via the X-Y deflection circuit 24 controls the data decoder 40 to synchronize the operation of the X-Y deflector 22 and the data decoder 40 to recognize the position of the data information recorded onto the target 10. The laser beam 14 is deflected in the scanning position as discussed for the writing operation. The deflected laser beam is directed to the mirror tunnel 28 where again the deflected laser beam is multiplied and projected to the beam selector 30. The beam selector 30 allows one laser beam to pass and strike one image 12*a* on the target 10.

The reflected light from the element on the image 12*a* of the target 10 will exhibit a clockwise or counterclockwise change in the polarization angle depending on whether it is reflected by a "1" or a "0" state magnetic field. Polarization change from a reflected surface that has an associated magnetic field is known as the Kerr-effect. The reflected light then passes through a polarizing filter 34. When the angle of the polarizing filter 34 corresponds to for instance a "1" state it will pass light to the lens system 36. In the "0" state there will be a substantial reduction in the light passing through the polarizing filter 34 because of the angular rotation change of polarization of the reflected laser beam.

The lens system 36 must comprise a lens of the correct focal length, resolution and aperture that is capable of collecting light from any part of the target and focusing the reflected laser beam light onto the light detector 38. As stated previously the light detector 38 could comprise a photocell or a photo multiplier transistor or any such device capable of responding to light intensity. Assuming that a reflected light that passed through the polarizing filter represented a "1" bit of information, when the output voltage signal of the light detector 38 is in a high or enable state it corresponds to a "1". Conversely when the output of the light detector 38 is in a low or disabled state, the signal will correspond to a "0." This information could be directed as a serially occurring string of information signals corresponding to the information recorded in the image area of the target.

Figure 7:
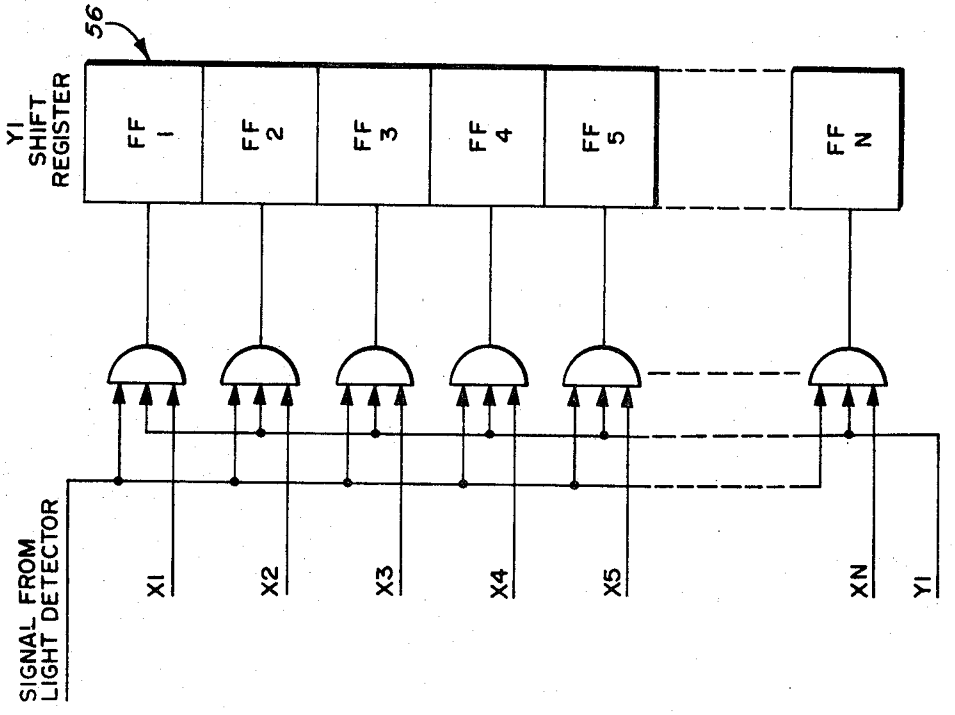
FIG. 7 is a logic diagram for a data decoder as shown in FIG. 1.

A decoder that could be used as the data decoder of FIG. 4 is shown in FIG. 7. Referring to FIG. 7, the signal from the light detector is directed to one leg of a series of AND-gates. The signal from the light detector is directed to all of the AND-gates simultaneously. The data decoder according to FIG. 7 could store all of the information from the image area. For instance, one shift register 56 can store all of the information of one line of information. This shift register 56 is shown as the Y1 shift register which could designate the first line scan of information recorded in the image area. The data decoder could comprise a shift register for each line of information and therefore could store all of the information in one image or the Y1 shift register might be representative of the information stored in one line of information and the data stored in that one line is transmitted into the utilization device after each line of information is read.

Still referring to FIG. 7 and assuming that the Y1 shift register only stores the information from Y1, the serial signals from the line detector are entered into the data decoder via all of the AND-gates. The AND-gates are selectively actuated by the X1 – XN signals in rotation. Thus if the signal coming from the light detector represents the first bit of information on the first line of the image the X1 signal will actuate one leg of the first AND-gate, the first bit of information on the first line is known as the X1 bit of information and therefore the X1 line to the AND-gate will be actuated. Therefore if a "1" bit of information is coming into the data decoder, the 1 bit of information being represented by a high or enabled signal from the light detector, the first AND-gate is actuated which in turn will actuate the first flip-flop FF1 of the Y1 shift register. X2, X3, X4 up to XN are actuated in turn according to the number of elements recorded on the image area. The reading circuit 54 controls the X-Y deflector 22 to actuate the laser beam and the data decoder 40 such that the data decoder knows exactly which particular element is being scanned by the laser beam. The amount of reflected light impinging on the light detector 38 can therefore be sensed and stored in the shift register 56 for use by the utilization device 42.

Thus what has been shown is the application of a mirror tunnel to a laser beam to produce multiple images on a target surface and thus multiply the storage capacity of the target surface by a factor which is equal to the image multiplication factor of the mirror tunnel. A beam selector selects one of these images to cause writing and/or reading of the information. It is, of course, obvious that a portion of the laser beam which is reflected from the target during a write operation can be used by the light detector to permit checking of the data recorded during the writing of the data onto the target. The reflected beam might have to be desensitized by a darkened lens for instance since the laser beam used on the write operation is of an intensity necessary to raise the element to or beyond the Curie-point temperature.

An alternative embodiment for a read only type system using a laser beam would transmit light through the magnetic film, rather than using reflected light. The light transmitted through the magnetic film again has a change in the polarization angle. This phenomenon is known as the Faraday-effect. Thus it is contemplated by this invention that the data information can be scanned from a multiple imaged target by either using the Kerr-effect in a reflected laser beam or the Faraday-effect with transmitting light through a transparent magnetic film. Likewise the laser beam intensity heating an area of the target in conjunction with applying a magnetic field to one raster image may be used to erase the recorded information.

The invention described permits a substantial increase in the storage capacity of a laser beam memory system without the need to move or rotate the target storage. The scheme offers random access capability with faster access time and larger storage capacities than any of the presently known inertialess optical memories.

While the principles of the invention have now been made clear in an illustrative embodiment, there will be immediately obvious to those skilled in the art many modifications of structure, arrangement, proportions, the elements, materials, and components used in the practice of the invention and otherwise which are particularly adapted for specific environment and operating requirements without departing from those principles. For instance the target may comprise a photo-sensitive surface such as a photographic emulsion or a photochromatic material or the surface could comprise a photoelectric or a thermo-sensitive material. It is also evident that the mirror tunnel could be triangularly shaped instead of a square or of any other geometric dimension suitable for the purpose intended in the embodiment as described. The appended claims are therefore intended to cover and embrace any such modifications, within the limits only of the true spirit and scope of the invention.

What I claim is:

1. An optical memory system comprising in combination:

light beam emitting means for emitting a high energy level light beam;

means for modulating said light beam emitting means in response to binary information bit signals;

X-Y deflecting means receiving the modulated light beam for deflecting said light beam in a horizontal and a vertical direction;

a mirror tunnel system receiving said light beam from said X-Y deflecting means and multiplying said light beam to produce a plurality of parallel light beams each displaced a distance from each other;

beam selector means for selectively allowing one light beam from said plurality of light beams to pass through said beam selector means;

a target having a plurality of image areas, said target being formed of a material sensitive to said light beam and positioned such that each of said plurality of parallel light beams scans a corresponding one of said image areas when said light beam is deflected by said X-Y deflecting means; and a polarizing filter for polarizing the light beam before said light beam strikes said image area;

said light beam being of sufficient energy level to cause a change in the material forming the target according to the binary information bit signals modulating said light beam.

2. The optical memory system according to claim 1 further including:

means for lowering the energy level of a reflex light beam reflected from the target caused by the light beam striking the target;

a polarizing filter for allowing the reflex light beams of one polarization angle to pass through and for preventing the reflex light beams of a second polarization angle to be lowered in intensity;

a gathering means for collecting the reflex light beams passing through said polarizing filter;

light detector means for sensing the light level collected by said gathering means and for generating a binary electrical signal in response thereto; and data decoding means connected to said light detector means for decoding the binary electrical signals according to the actuation of the modulating means and the X-Y deflecting means.

3. The optical memory system according to claim 1 wherein said light beam emitting means is a laser system.

4. The optical memory system according to claim 1 wherein said beam selector means is a plurality of Kerr-type optical cells.

5. An optical memory system comprising in combination:

a laser system emitting a light beam amplified by stimulated emission of radiation;

means for modulating the light beam emitted by said laser system in response to binary information signals;

X-Y deflecting means receiving the modulated light beam for deflecting said light beam in a horizontal and a vertical direction;

a mirror tunnel system for multiplying said light beam to produce a plurality of parallel light beams each displaced a distance from each other;

beam selector means for selectively allowing one light beam from said plurality of light beams to pass through said beam selector means;

a target having a plurality of image areas, said target being formed of a magnetic film and positioned such that each of said plurality of parallel light beams scans a corresponding one of said image areas when said light beam is deflected by said X-Y deflecting means, and means for polarizing said light beam before said light beam strikes said target;

said laser system producing a light beam of sufficient energy such that each of said plurality of parallel light beams is capable of raising one element in the image area of said target to the Curie-point temperature of the target material.

6. An optical memory system comprising in combination:

light beam emitting means for emitting a high energy level light beam;

X-Y deflecting means receiving said light beam for deflecting said light beam in a horizontal and a vertical direction; a mirror tunnel system for multiplying said light beam to produce a plurality of parallel light beams each displaced a distance from each other;

beam selector means for selectively allowing one light beam from said plurality of light beams to pass through said beam selector means;

a target having a plurality of image areas, said target being formed of a material sensitive to said light beam and positioned such that each of said plurality of parallel light beams scans a corresponding one of said image areas when said light beam is deflected by said X-Y deflecting means, said image areas having elements recorded with binary information bits such that the light beam after striking the element varies in intensity between a recorded "1" bit and a recorded "0" bit;

light detector means for sensing the binary variance in intensity and for generating binary electrical signals in response thereto;

data decoding means connected to said light detector means for decoding the binary electrical signals;

controlling means for controlling the operation of said X-Y deflection means and said data decoder means; and a utilization device for actuating said controlling means and for utilizing said decoded binary electrical signals therein.

* * * * *